United States Patent
Fushimi et al.

(10) Patent No.: US 6,906,154 B2
(45) Date of Patent: Jun. 14, 2005

(54) CATALYST FOR THE POLYMERIZATION OF OLEFINS

(75) Inventors: Masaki Fushimi, Oita (JP); Hirotoshi Takahashi, Oita (JP)

(73) Assignee: Basell Poliolefine Italia S.p.A., Milan (IT)

( * ) Notice: Subject to any disclaimer, the term of this patent is extended or adjusted under 35 U.S.C. 154(b) by 217 days.

(21) Appl. No.: 10/181,170

(22) PCT Filed: Nov. 12, 2001

(86) PCT No.: PCT/EP01/13142
§ 371 (c)(1),
(2), (4) Date: Apr. 15, 2002

(87) PCT Pub. No.: WO02/44219
PCT Pub. Date: Jun. 6, 2002

(65) Prior Publication Data
US 2003/0027715 A1 Feb. 6, 2003

(30) Foreign Application Priority Data
Nov. 29, 2000 (JP) ...................... 2000-363683

(51) Int. Cl.⁷ ................................ C08F 4/42
(52) U.S. Cl. .................. 526/124.3; 526/348; 526/138; 526/124.1; 526/124.2; 502/103; 502/126; 502/127; 502/125
(58) Field of Search ................. 526/348, 138, 526/124.3, 124.2, 124.1, 123.1; 502/103, 126, 127, 125

(56) References Cited

U.S. PATENT DOCUMENTS

| 4,298,718 A | 11/1981 | Mayr et al. | ................. 526/125 |
| 4,495,338 A | 1/1985 | Mayr et al. | ................. 526/125 |

FOREIGN PATENT DOCUMENTS

| EP | 0344755 | 12/1989 | ............. C08F/4/02 |
| EP | 0361494 | 4/1990 | ........... C08F/4/654 |
| EP | 0383346 | 8/1990 | ........... C08F/4/649 |
| EP | 0 704 424 | * 4/1996 | |
| EP | 0 728 769 | * 8/1996 | |
| WO | 9957160 | 11/1999 | ........... C08F/4/651 |

* cited by examiner

*Primary Examiner*—L. S. Choi

(57) ABSTRACT

The present invention relates to catalyst components for the polymerization of olefins comprising a titanium compound, having at least a Ti-halogen bond, and at least two electron donor compounds supported on a Mg dihalide, said catalyst component being characterized by the fact that at least one of the electron donor compounds is selected from ethers containing two or more ether groups which are further characterized by the formation of complexes with anhydrous magnesium dichloride in an amount less than 60 mmoles per 100 g of $MgCl_2$ and by the failure of entering into substitution reactions with $TiCl_4$ or by reacting in that way for less than 50% by moles, and at least another electron donor compound is selected from esters of mono or polycarboxylic acids. Said catalyst components are able to produce propylene polymers which, for high values of xylene insolubility, show a broad range of isotacticity.

15 Claims, No Drawings

CATALYST FOR THE POLYMERIZATION OF OLEFINS

This application is the U.S. national phase of International Application PCT/EP01/13142, filed Nov. 12, 2001.

The present invention relates to a catalyst for olefin polymerization, and a process for the olefin polymerization using the same.

BACKGROUND ART

It is well known to use a solid catalyst component comprising a magnesium halide, and supported thereon, a titanium compound containing at least one Ti-halogen bond and an electron-donating compound for producing olefin polymers.

Particularly, European patent application No. 361,494 reported that the use of certain diether compounds as an electron-donating compound (an internal donor) provides a highly active catalyst even without using another electron-donating compound (an external donor). Furthermore, the addition of an external donor, such as an organic silicon compound, a diether compound, a nitrogen compound or a carboxylate compound, to the above catalyst, allows one to obtain a polymer with very high level of stereo-regularity while maintaining high catalytic activity (EP 728769).

It is also recognized that an alikoxyester compound is effective as the internal donor of olefin polymerization catalysts (EP 383346). Furthermore, it is reported that when the alkoxyester is employed as an external donor for a catalyst using a phthalate or ketoester compound as an internal donor, the catalyst provides a polymer having excellent polymer properties (EP704424). It is however always felt the need of improved catalysts systems with high activity and good hydrogen response during polymerization, and capable to produce an olefin polymer having a very high stereo-regularity.

SUMMARY OF THE INVENTION

The present inventors have surprisingly found that by using certain alkoxyesters as external donors coupled with specific diethers as internal donors is possible to obtain catalysts able to satisfying the above-mentioned needs. As a result, the present invention provides an olefin polymerization catalyst which comprises, (A) A solid catalyst component comprising magnesium, titanium, halogen and an electron-donating compound selected from ether compounds having at least two ether groups and that, under standard conditions, are capable of forming complexes with anhydrous magnesium chloride for less that 60 mmoles per 100 g of chloride and that they do not undergo substitution reactions with $TiCl_4$, or they only do so for less than 50% in moles;
(B) An organic aluminum compound; and
(C) An alkoxyester compound represented by the general formula I:

(I)

in which each of $R^1$, $R^2$, $R^3$ and $R^4$ is, independently, an aliphatic hydrocarbon group, an alicyclic hydrocarbon group, an aromatic hydrocarbon group, a polycyclic hydrocarbon group or a heterocyclic compound group, Z represents an aliphatic or alicyclic hydrocarbon group which may be substituted with an aromatic group or a polycyclic group, and i, j and k each are integers from 0 to 3 with the proviso that the sum of i, j and k is at least 1.

DETAILED DESCRIPTION OF THE INVENTION

The preferred titanium compounds used in the catalyst component (A) are those containing at least a Ti-halogen bond. Among them particularly preferred are $TiCl_4$ and $TiCl_3$; furthermore, also Ti-haloalcoholates of formula $Ti(OR)_{n-y}X_y$ can be used, where n is the valence of titanium, y is a number between 1 and n–1 X is halogen and R is a hydrocarbon radical having from 1 to 10 carbon atoms. The said titanium compounds are suitably supported on a magnesium halide. The magnesium halide is preferably $MgCl_2$ in active form which is widely known from the patent literature as a support for Ziegler-Natta catalysts. Patents U.S. Pat. Nos. 4,298,718 and 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

In a particular embodiment of the present invention the ether compounds having at least two ether groups can be selected among the class of the 1,3-diethers of formula (II)

(II)

where $R^I$ and $R^{II}$ are the same or different and are hydrogen or linear or branched $C_1$–$C_{18}$ hydrocarbon groups which can also form one or more cyclic structures; $R^{III}$ groups, equal or different from each other, are hydrogen or $C_1$–$C_{18}$ hydrocarbon groups; $R^{IV}$ groups equal or different from each other, have the same meaning of $R^{III}$ except that they cannot be hydrogen; each of $R^I$ to $R^{IV}$ groups can contain heteroatoms selected from halogens, N, O, S and Si. Preferably, $R^{IV}$ is a 1–6 carbon atom alkyl radical and more particularly a methyl while the $R^{III}$ radicals are preferably hydrogen. Moreover, when $R^I$ is methyl, ethyl, propyl, or isopropyl, $R^{II}$ can be ethyl, propyl, isopropyl, butyl, isobutyl, tert-butyl, isopentyl, 2-ethylhexyl, cyclopentyl, cyclohexyl, methylcyclohexyl, phenyl or benzyl; when $R^I$ is hydrogen, $R^{II}$ can be ethyl, butyl, sec-butyl, tert-butyl, 2-ethylhexyl, cyclohexylethyl, diphenylmethyl, p-chlorophenyl, 1-naphthyl, 1-decahydronaphthyl; $R^I$ and $R^{II}$ can also be the same and can be ethyl, propyl, isopropyl, butyl, isobutyl, tert-butyl, neopentyl, phenyl, benzyl, cyclohexyl, cyclopentyl.

Specific examples of ethers that can be advantageously used include: 2-(2-ethylhexyl) 1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-dimethoxypropane, 2-(2-phenylethyl)-1,3-dimethoxypropane, 2-(2-cyciobexylethyl)-1,3-dimethoxypropane, 2-(p-chlorophenyl)-1,3-dimethoxypropane, 2-(diphenylmethyl)-1,3-dimethoxypropane, 2(1-naphthyl)-1,3-dimethoxypropane, 2(p-fluorophenyl)-1,3-dimethoxypropane, 2(1- decahydronaphthyl)-1,3-dimethoxypropane, 2(p-tert-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2,2-diethyl-1,3-diethoxypropane, 2,2-dicyclopentyl-1,3-dimethoxypropane, 2,2-dipropyl-1,3-diethoxypropane, 2,2-dibutyl-1,3-diethoxypropane, 2-methyl-2-ethyl-1,3-diniethoxypropane, 2-methyl-2-propyl-1,3-dimethoxypropane, 2-rnethyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chiorophenyl)-1,3-dimethoxypropane, 2,2-bis(2-phenylethyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-bis(2-ethylhexyl) -1,3-dimethoxypropane,2,2-bis(p-methylphenyl)-1,3-dimethoxypropane, 2-methyl -2-isopropyl-1,3-dimethoxypropane, 2,2-diisobutyl-1,3-dimethoxypropane, 2,2-diphenyl -1,3-dimethoxypropane, 2,2-dibenzyl-1,3-dimethoxypropane, 2-isopropyl-2-cyclopentyl -1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl 1,3-dimethoxypropane, 2,2-di-sec-butyl-1,3-dimethoxypropane, 2,2-di-tert-butyl -1,3-dimethoxypropane, 2,2-dineopentyl-1,3-dimethoxypropane, 2-iso-propyl-2-isopentyl -1,3-dirnethoxypropane, 2-phenyl-2-benzyl-1,3-dimethoxypropane, 2-cyclohexyl -2-cyclohexylmethyl-1,3-dimethoxypropane.

In another particular embodiment the electron donor having at least two ether groups can be selected among the class of cyclopolyenic 1,3-diether in which the carbon atom in position 2 belongs to a cyclic or polycyclic structure made up of 5, 6, or 7 carbon atoms, or of 5-n or 6-n' carbon atoms, and respectively n nitrogen atoms and n' heteroatoms selected from the group consisting of N, O, S and Si, where n is 1 or 2 and n' is 1, 2 or 3, said structure containing two or three unsaturations (cyclopolyenic structure), and optionally being condensed with other cyclic structures, or substituted with one or more substitutes selected from the group consisting of linear or branched alkyl radicals: cycloalkyl, aryl, aralkyl, alkaryl radicals and halogens, or being condensed with other cyclic structures and substituted with one or more of the above mentioned substitutes selected that can also be bonded to the condensed cyclic structures; one or more of the above mentioned alkyl, cycloalkyl, aryl, aralkyl, or alkaryl radicals and the condensed cyclic structures optionally containing one or more heteroatoms as substitutes for carbon or hydrogen atoms, or both.

The above mentioned substitutes in cyclopolyenic 1,3-diethers are selected from the group consisting of linear or branched alkyl groups having 1 to 20 carbon atoms, cycloalkyl groups having 3 to 20 carbon atoms, aryl groups having 6 to 20 carbon atoms, aralkyl groups having 7 to 20 carbon atoms, alkaryl groups having 7 to 20 carbon atoms, Cl and F.

Heteroatoms optionally existing in alkyl, cycloalkyl, aryl, aralkyl and alkaryl groups and/or in condensed ring structure are preferably selected from the group consisting of N, O, S, P, Si and halogen, more preferably selected from Cl and F.

A specific subgroup of cyclopolyenic 1,3-diethers is represented in the general formula (III):

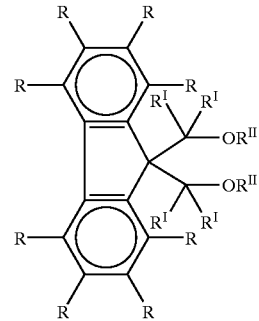

(III)

where the R groups, equal or different, are hydrogen, halogens preferably Cl and F; $C_1$–$C_{20}$ alkyl groups, linear or branched, $C_3$–$C_{20}$ cycloalkyl, $C_6$–$C_{20}$ aryl, $C_7$–$C_{20}$ alkylaryl or $C_7$–$C_{20}$ aralkyl groups, optionally containing one or more heteroatoms selected from the group consisting of N, O, S, P, Si and halogens, in particular Cl and F, as substitutes for carbon or hydrogen atoms, or both; the groups $R^I$, same or different to each other, are selected from the group consisting of hydrogen, halogens preferably Cl and F, $C_1$–$C_{20}$ alkyl groups, linear or branched; $C_3$–$C_{20}$ cycloalkyl, $C_6$–$C_{20}$ aryl, $C_7$–$C_{20}$ alkaryl and $C_7$–$C_{20}$ arallyl groups, the $R^{II}$ groups, same or different to each other, are selected from the group consisting of $C_1$–$C_{20}$ alkyl groups, linear or branched; $C_3$–$C_{20}$ cycloalkyl, $C_6$–$C_{20}$ aryl, $C_7$–$C_{20}$ alkaryl and $C_7$–$C_{20}$ aralkyl groups.

Specific examples of cyclopolyenic 1,3-diethers are:
9,9-bis(methoxymethyl)-fluorene;
9,9-bis(methoxymethyl)-2,3,6,7-tetramethylfluorene;
9,9-bis(methoxymethyl)-2,3,4,5,6,7-hexafluorofluorene;
9,9-bis(methoxymethyl)-2,3-benzofluorene;
9,9-bis(metboxymethyl)-2,3,6,7-dibenzofluorene;
9,9-bis(methoxymethyl)-2,7-diisopropylfluorene;
9,9-bis(methoxymethyl)-1,8-dichlorofluorene
9,9-bis(methoxymethyl)-2,7-dicyclopentylfluorene;
9,9-bis(methoxymethyl)-1,8-difluorofluorene;
9,9-bis(methoxymethyl)-1,2,3,4-tetrahydrofluorene;
9,9-bis(methoxymethyl)-1,2,3,5,6,7,8-octahydrofluorene;
9,9-bis(methoxymethyl)-4-tert-butylfluorene;
1,1-bis(1'-butoxyethyl)-cyclopentadiene;
1,1-bis(1'-isopropoxy-n-propyl)cyclopentadiene;
methoxymethyl-1-(1'-methoxyethyl)-2,3,4,5-tetramethylcyclopentadiene;
1,1-bis(alpha-methoxybenzyl)indene;
1,1-bis(phenoxymethyl)-3,6-dicyclohexylindene
9,9-bis(alpha-methoxybenzyl)fluorene;
9,9-bis(1'-isopropoxy-n-butyl)-4,5-diphenylfluorene;
9,9-bis(1'-methoxyethyl)fluorene;
9-methoxymethyl-9-(1'-methoxyethyl)fluorene;
9-methoxymethyl-9-[2-(2-methoxypropyl)]-fluorene;
1,1-bis(methoxymethyl)-2,5-cyclohexadiene;
1,1-bis(methoxymethyl)benzonaphthene;
7,7-bis(methoxymethyl)-2,5-norbornadiene;
9,9-bis(methoxymethyl)-1,4-methanedihydronaphthalene.

The preparation of the solid catalyst component (A) of the present invention may be carried out according to various methods.

For example, a magnesium halide, a titanium compound and an ether compound having at least two ether groups disclosed in (A), are milled together under the conditions where activation of the magnesium halide occurs.

The milled product is then treated one or more times with excess $TiCl_4$ at a temperature between 80 and 135° C. under the optional existence of the said ether compound having at least two ether groups, and then washed repeatedly with a hydrocarbon, e.g. hexane, until all chlorine ions are not detected in the washing medium.

According to another method, an anhydrous magnesium halide is pre-activated according to known methods in the prior art and then reacts with an excess of $TiCl_4$ which contains said ether compound having at least two ether groups and optionally an aliphatic, cycloaliphatic, aromatic or chlorinated hydrocarbon solvent (for example, hexane, heptane, cyclohexane, toluene, ethylbenzene, chlorobenzene and dichloroethane).

In this case also the operation is performed at a temperature between 80 and 135° C. The reaction with $TiCl_4$ is repeated with or without the presence of an additional amount of ether compound having at least two ether groups, and the solid is then washed with hexane to eliminate unreacted $TiCl_4$.

According to another method, an $MgCl_2 \cdot nROH$ adduct (particularly in the form of spheroidal particles) in which n is generally a number from 1 to 6, and ROH is an alcohol such as ethanol, butanol or isobutanol for example, reacts with an ether compound having at least two ether groups and with an excess of $TiCl_4$ containing one of the above mentioned hydrocarbon solvents.

The initial reaction temperature is from 0 to 25° C. and is then raised to a temperature between 80 to 135° C. After the reaction, the solid is treated once more with $TiCl_4$, in the presence or absence of the ether compound having at least two ether groups, then separated and washed with a hydrocarbon until chlorine ions are not detected in the solvent.

According to another method, magnesium alcoholate and magnesium chloroalcoholate may be allowed to react under reaction conditions described above with excess $TiCl_4$ containing the ether compound having at least two ether groups.

According to another method, a complex of a magnesium halide and a titanium alcoholate (as a representative example, $MgCl_2 \cdot 2Ti(OC_4H_9)_4$ complex) are allowed to react in a hydrocarbon solution, with an excess of $TiCl_4$ containing the ether compound having at least two ether groups in a hydrocarbon solution. The solid product is separated and further reacted with an excess of $TiCl_4$ in the presence or absence of additional ether compound having at least two ether groups and then separated and washed with hexane.

The reaction with $TiCl_4$ is carried out at a temperature between 80° C. and 130° C. According to a similar method, the complex of $MgCl_2$ and titanium alcoholate is caused to react with polyhydrosiloxane in a hydrocarbon solution; then the separated solid product undergoes reaction at 50° C. with silicon tetrachloride. Then, the solid obtained is caused to react with an excess of $TiCl_4$ at a temperature ranging from 80 to 130° C. in the presence or absence of an ether compound having at least two ether groups.

Without relation to a specific catalyst preparation method mentioned above, it is preferable to separate the solid material obtained after the last reaction with $TiCl_4$ in the presence of an ether compound having at least two ether groups, then to cause said solid material to react with excess $TiCl_4$ at a temperature between 80 to 135° C., and further to be washed by a hydrocarbon solvent. Finally, it is possible to cause excess $TiCl_4$ containing the ether compound having at least two ether groups to react with porous resins such as partially cross-linked styrene-divinylbenzene in spherical particle form, or porous inorganic oxides such as silica and alumina, impregnated with a solution of magnesium compound or complex soluble in organic solvents.

The porous resins which can be used are described in the published European patent application No. 344,755. The reaction with $TiCl_4$ is carried out at a temperature between 80 to 100° C. After separating the excess $TiCl_4$, the reaction is repeated and the solid obtained is then washed with a hydrocarbon.

The molar ratio of the magnesium halide/the ether compound having at least two ether groups used in the reactions indicated above generally may range from 4:1 to 12:1. The ether compound having at least two ether groups is fixed on the magnesium halide in a quantity generally ranging from 1 to 20 molar weight %.

While Mg/Ti ratio of the solid catalyst component (A) is generally in the range of 30:1 to 4:1, such ratio may be different for the component supported on a resin or an inorganic oxide, and generally in the range of 20:1 to 2:1.

In the present invention, the amount of the solid catalyst component in the polymerization system is normally in the range of 0.005 to 0.5 mmol/L, and preferably in the range of 0.01 to 0.5 mmol/L converted to Ti atom.

The aluminum alkyl cocatalyst (B) can be chosen among those of formula (IV):

$$AlR^5R^6R_7 \qquad (IV)$$

in which $R^5$, $R^6$ and $R^7$ may be the same or different and each represents a hydrocarbon group having 12 or less carbon atoms, a halogen atom or a hydrogen atom, provided that at least one of $R^5$, $R^6$ and $R^7$ is a hydrocarbon group.

Representative examples of the organic aluminum compounds represented by formula (5) include a trialkyl aluminum such as triethyl aluminum, tripropyl aluminum, tributyl aluminum, triisobutyl aluminum, trihexyl aluminum and trioctyl aluminum; an alkyl aluminum hydride such as diethyl aluminum hydride and diisobutyl aluminum hydride; and an alkyl aluminum halide such as diethyl aluminum chloride, diethyl aluminum bromide and the like.

Preferred among these organic aluminum compounds are a trialkyl aluminums which provides excellent result.

In the polymerization of olefins, the amount of the organic aluminum compound to be used in the polymerization system is generally not less than $10^{-4}$ mmol/L, preferably not less than $10^{-2}$ mmol/L. The molar proportion of the organic aluminum compound to titanium atom in the solid catalyst component is generally not less than 0.5, preferably not less than 2, particularly not less than 10. If the amount of the organic aluminum compound to be used is too small, the polymerization activity may be drastically reduced. Preferably, the amount of the organic aluminum compound to be used in the polymerization system is not less than 20 mmol/L and the molar proportion of the organic aluminum compound to titanium atoms is not less than 1,000. The alkoxyester compounds (C) used in the present invention is represented by the above-mentioned general formula (1)

$$(R^1O)_i(R^2O)_j(R^3O)_k-Z-COOR^4 \qquad (I)$$

where $R^1$, $R^2$, $R^3$ and $R^4$, same or different to each other, represent one of more of alilphatic hydrocarbon groups, alicyclic hydrocarbon group, aromatic hydrocarbon groups, polycyclic hydrocarbon groups, and heterocyclic compound groups. When they are aliphatic or alicyclic hydrocarbon groups, the former having 1 to 20 carbon atoms or the latter having 4 to 12 carbon atoms are preferable.

Exemplary compounds are methyl, ethyl, n-propyl, i-propyl, n-butyl, i-butyl, sec-butyl, tert-butyl, hexyl, 3-methylpentyl, tert-pentyl, heptyl, 5-hexyl, octyl, nonyl, decyl, 2,3,5-trimethyihexyl, undecyl, dodecyl, vinyl, allyl, 2-hexenyl, 2,4-bexadienyl, isopropenyl, cyclobutyl, cyclopentyl, cyclohexyl, tetramethylcyclohexyl, cyclohexenyl, and norbornyl groups. Hydrogen atoms of these groups may be substituted with halogen atoms.

If any of $R^1$, $R^2$, $R^3$ and $R^4$ is an aromatic or polycyclic hydrocarbon group, the former having 6 to 18 carbon atoms or the latter having 4 to 12 carbon atoms is preferable.

Specific examples are phenyl, tolyl, ethylphenyl, xylyl, cumyl, trimethylphenyl, tetramethylphenyl, naphthyl, methylnaphtliyl, and anthranyl groups. Hydrogen atoms of these groups may be substituted with halogen atoms.

If any of $R^1$, $R^2$, $R^3$ and $R^4$ is a heterocyclic compound group, that having 6 to 18 carbon atoms is preferable. Specific examples are furyl, tetrahydrofuryl, thienyl, pyrrolyl, imidazolyl, indolyl, pyridyl, and piperidyl groups. Hydrogen atoms of these groups may be substituted with halogen atoms.

If any of $R^1$, $R^2$, $R^3$ and $R^4$ is a group of an aromatic hydrocarbon, polycyclic hydrocarbon, or heterocyclic compound, connected to an aliphatic hydrocarbon, a group of an aromatic hydrocarbon or polycyclic hydrocarbon having 6 to 18 carbon atoms or a group of a heterocyclic compound having 4 to 18 carbon atoms, connected to an aliphatic hydrocarbon having 1 to 12 carbon atoms, is preferable. Specific examples are benzyl, diphenylmethyl, indenyl, and furfuryl groups. Hydrogen atoms of these groups may be substituted with halogen atoms.

Z is preferably an aliphatic hydrocarbon group having 1 to 20 carbon atoms or an alicyclic hydrocarbon group having 4 to 20 carbon atoms, in which a hydrogen atom may be substituted with an aromatic group having 6 to 18 carbon atoms or a polycyclic hydrocarbon group having 4 to 20 carbon atoms. As specific examples, there can be mentioned methylene, ethylene, ethylidene, trimethylene, tetramethylene, pentamethylene, hexamethylene, ethenylene, vinylidene and propenylene groups. As examples of the substituted hydrocarbon groups, there can be mentioned methylmethylene, n-butylmethylene, ethylethylene, isopropylethylene, tert-butylethylene, sec-butylethylene, tert-amylethylene, adamantylethylene, bicyclo[2,2,1]heptylethylene, phenylethylene, tolylethylene, xylylethylene, diphenyltrimethylene, 1,2-cyclopentylene, 1,3-cyclopentylene, 3-cyclohexe-1,2-ylene, dimethylethylene, and inde-1,2-ylene groups. Hydrogen atoms of these groups may be substituted with halogen atoms.

As specific examples of the alkoxyester compounds of formula (1), there can be mentioned methyl methoxyacetate, ethyl methoxyacetate, butyl methoxyacetate, phenyl methoxyacetate, methyl ethoxyacetate, ethyl ethoxyacetate, butyl ethoxyacetate, phenyl ethoxyacetate, ethyl n-propoxyacetate, ethyl iso-propoxyacetate, methyl n-butoxy acetate, methyl iso-butoxyacetate, ethyl n-hexyloxyacetate, octyl sec-hexyloxyacetate, methyl 2-methylcyclohexyloxyacetate, methyl 3-methoxypropionate, n-octyl 3-ethoxypropionate, dodecyl 3-ethoxypropionate, pentamethyiphenyl 3-ethoxypropionate, n-octyl 3-ethoxypropionate, dodecyl 3-ethoxypropionate, ethyl 3-(i-propoxy)propionate, butyl 3-(i-propoxy)propionate, allyl 3-(n-propoxy)propionate, cyclohexyl 3-(n-butoxy)propionate, ethyl 3-neopentyloxypropionate, butyl 3-(n-octyloxy)propionate, methyl 3-(2,6-dimethylhexyloxy)propionate, octyl 3-(3,3-dimethyldecyloxy)propionate, ethyl 4-ethoxybutyrate, cyclohexyl 4-ethoxybutyrate, octyl 5-(n-propoxy)valerate, ethyl 12-ethoxylaurate, ethyl 3-(1-indenoxy)propionate, methyl 3-methoxyacrylate, methyl 2-methoxyacrylate, methyl 2-ethoxyacrylate, ethyl 3-phenoxyacrylate, ethyl 2-methoxypropionate, n-butyl 2-(i-propoxy)butyrate, methyl 2-ethoxyisobutyrate, phenyl 2-cyclohexyloxyisovalerate, butyl 2-ethoxy-2-phenylacetate, allyl 3-neopentyloxybutyrate, methyl 3-ethoxy-3-(o-methylphenyl)propionate. Among them, an alkoxyester compound represented by the following general formula (V) is preferable.

In the above formula each of $R^{14}$ and $R^{16}$ independently represents an aliphatic hydrocarbon group having 1 to 20 carbon atoms; each of $R^{13}$ and $R^{15}$ independently represents a hydrogen atom or an aliphatic hydrocarbon group having 1 to 20 carbon atoms.

Y represents a divalent linear hydrocarbon group having 1 to 4 carbon atoms, which is substituted with an aliphatic hydrocarbon group, an aromatic hydrocarbon group or a polycylic hydrocarbon group, or an alicyclic hydrocarbon group having 6 to 12 carbon atoms.

The most preferred is an alkoxy ester having a bulky substituting group with at least 3 carbon atoms at the second or third position counted from the carboxyl group, and Y represents a linear hydrocarbon group.

Furthermore, an alkoxyester compound having a 4- to 8-membered cycloalkane at the second or third position counted from the carboxyl group is also preferable.

Specific examples of such compounds are, ethyl 3-ethoxy-2-phenypropionate, ethyl 3-ethoxy-2-tolylpropionate, ethyl 3-ethoxy-2-mesitylpropionate, ethyl 3-butoxy-2-(methoxyphenyl) propionate, methyl 3-iso-propoxy-3-phenylpropionate, ethyl 3-ethoxy-3-phenylpropionate, ethyl 3-ethoxy-3-tert-butylpropionate, ethyl 3-ethoxy-3-adamantylpropionate, ethyl 3-ethoxy-2-tert-butylpropionate, ethyl 3-ethoxy-2-tert-amylpropionate, ethyl 3-ethoxy-2-adamnantylpropionate, ethyl 3-ethoxy-2-bicyclo[2,2,1]heptylpropionate, ethyl 2-ethoxycyclohexanecarboxylate, methyl 2-(ethoxymethyl) cyclohexanecarboxylate, methyl 3-ethoxynorbomane-2-carboxylate, ethyl 2,2-diisobutyl-3-methoxy-propionate, methyl 2-iso-propyl-2-iso-pentyl-3-methoxy-propionate, ethyl 2-iso-propyl-2-iso-pentyl-3-methoxy-propionate, methyl 2-iso-propyl-2-cyclopentyl-3-methoxy-propionate, ethyl 2-iso-propyl-2-cyclopentyl-3-methoxy-propionate, methyl 2-cyclopentyl-2-iso-pentyl-3-methoxy-propionate, ethyl 2-cyclopentyl-2-iso-pentyl-3-methoxy-propionate, methyl 2,2-dicyclopentyl-3-methoxy-propionate, and ethyl 2,2-dicyclopentyl-3-methoxy-propionate. The olefin polymerization process of the present invention is a process for polymerizing or co-polymerizing olefins of formula $CH_2=CHR$, in which R is hydrogen or a hydrocarbyl radical with 1–12 carbon atoms, using the catalysts of the invention. Representative examples of such an olefin include ethylene, propylene, buten-1, 4-methylpentene-1, hexene-1, and octene-1. The process of the present invention is advantageously used for the stereo-specific polymerization of olefins having three or more carbon atoms and most favorably used for the propylene polymerization.

In the polymerization process, the solid catalyst component of the present invention, the organic aluminum compound, and the alkoxyester compound may be separately introduced into the polymerization vessel. Alternatively, two or all of these components may be previously mixed. Typically, an inert solvent hereinafter described, the organic aluminum compound and the alkoxyester compound described above may be mixed in a dropping funnel the air in which has been replaced by nitrogen. After the lapse of a predetermined period of time (over about 1 minute), this mixture is preferably brought into contact with the solid catalyst component so that it undergoes further reaction for a predetermined period of time (over about 1 minute), and then introduced into the polymerization reaction vessel. Examples of the inert solvent employable herein include aliphatic hydrocarbons such as pentane, hexane, heptane, n-octane, isooctane, cyclohexane and methyl cyclohexane, alkylaromatic hydrocarbon such as toluene, xylene, ethylbenzene, isopropylbenzene, ethyltoluene, n-propylbenzene, diethylbenzene, monoalkyl naphthalene and diallcyl naphthalene, halogenated or hydrogenated aromatic hydrocarbon such as chlorobenzene, chloronaphthalene, orthodichlorobenzene, tetrahydronaphthalene and decahydronaphthalene, high molecular weight liquid paraffin, and mixture thereof.

The polymerization of olefins according to the present invention can be carried out under an atmospheric or higher pressure. In gas phase polymerization, while the monomer pressure shall not be lower than the vapor pressure at the olefin polymerization temperature, in general the monomer pressure is in the range of atmospheric pressure to 100 kg/cm$^2$, preferably in the range of about 2 to 50 kg/cm$^2$.

In another specific embodiment the polymerization may be carried out in liquid phase using an inert solvent (solution polymerizafion) or a diluent (slurry or bulk process). Dilution solvents preferable for a slurry polymerization comprise alkanes and cycloalkanes such as pentane, hexane, heptane, normal octane, cyclohexane and methylcyclohexane, alkylaryl hydrocarbons such as toluene, xylene, ethylbenzene, isopropylbenzene, ethyltoluene, normal propylbenzene, diethylbenzene and mono- or di-alkylnaphthalene, halogenated or hydrogenated aromatic hydrocarbons such as chlorobeizene, chloronaphthalene, ortho-dichlorobenzene, tetrahydronaphthalene and decabydronaphthalene, high molecular weight liquid paraffin, their mixtures and other well known dilution solvents.

Further, the polymerization can be carried out by two or more sequential polymerization step with different polymerization conditions for each step.

A molecular weight modifier (generally hydrogen) may be allowed to co-exist in order to obtain a polymer having a melt flow suitable for a practical use.

A stirred bed reactor, fluidized bed reactor and the like may be used for the gas polymerization process useful for the implementation of the present invention.

Although generally unnecessary, the completion, suspension of the polymerization or inactivation of the catalysts may be carried out by contacting the catalysts with water, alcohol or acetone that are well known as catalyst poisons or other appropriate catalyst deactivation agents. The polymerization temperature is generally between minus 10 and plus 180° C., preferably between 20 and 100° C. in view of obtaining excellent catalyst capabilities and high production speed, and the most preferably between 50 to 80° C. It is preferable to conduct pre-polymerization although it is not necessarily required. While olefins used in the pre-polymerization may be the same or different from the olefins employed in the polymerization mentioned above, propylene is preferred. The reaction temperature of the pre-polymerization is in the range of minus 20 to plus 100° C., preferably between minus 20 to plus 60° C.

It is desirable to conduct the pre-polymerization so as to produce 0.1 to 1000 g of polymer per 1 g of the solid catalyst for olefin polymerization, preferably between 0.3 to 100 g, most preferably between 1 to 50 g of polymer per 1 g of the solid catalyst. The pre-polymerization may be effected in a batch or continuous process.

Following are the illustrative examples of the present invention which examples shall not be construed as to limit the scope of the present invention.

EXAMPLES

Characterization

Complexing Test of the Ethers with $MgCl_2$

In a 100 ml glass flask with fixed blades mechanical stirrer are introduced under nitrogen atmosphere in order:

70 ml of anhydrous n-beptane 12 mmoles of anhydrous $MgCl_2$ activated as described below 2 mmoles of ether.

The content is allowed to react at 60° C. for 4 hours (stirring speed at 400 rpm). It is then filtered and washed at ambient temperature with 100 ml of n-heptane after which it is dried with a mechanical pump.

The solid is characterized, after having been treated with 100 ml of ethanol, by way of a gaschromatographic quantitative analysis for the analysis of the quantity of ether fixed.

The magnesium chloride used in the complexing test with the ethers is prepared as follows. In a 1 liter vibrating mill jar (Vibratom from Siebtechnik) containing 1.8 Kg of steel spheres 16 mm in diameter, are introduced under nitrogen atmosphere, 50 g of anhydrous $MgCl_2$ and 6.8 ml of 1,2-dichloroethane (DCE).

The content is milled at room temperature for 96 hours, after which the solid recovered is kept under vacuum in the mechanical pump for 16 hours at 50° C.

Characterization of the Solid:

Presence of a halo with maximum intensity at $2\theta=32.1°$.

Surface area (B.E.T)=125 m$^2$/g residual DCE=2.5% by weight.

Test of the Reaction with $TiCl_4$

In a 25 ml test-tube with a magnetic stirrer and under nitrogen atmosphere are introduced: 10 ml of anhydrous n-heptane, 5 mmoles of $TiCl_4$ and 1 mmole of donor. The content is allowed to react at 70° C. for 30 minutes, after which it is cooled to 25° C. and decomposed with 90 ml of ethanol.

The solutions obtained are analyzed by gaschromatography.

The melt flow rate ("MFR") described in the examples was measured in compliance with the condition L of ASTM D1238.

Determination of Xylene Insolubility

In order to measure the insoluble portion of a polymer in xylene (XI %), the polymer was dissolved in 250 mL of xylene at the temperature of 135° C. under agitation, then after 20 minutes allowed to cool down to 25° C. The precipitated polymer was filtered after 30 minutes, then dried under vacuum at the temperature of 80° C.

Example 1

Preparation of the Microspheroidal $MgCl_2.1C_2H_5OH$.

Forty-eight (48) g of anhydrous $MgCl_2$, 77 g of anhydrous $C_2H_5OH$, and 830 ml of kerosene were fed, in inert gas and at ambient temperature, into a 2 liter autoclave equipped with a turbine agitator and drawing pipe. The content was heated to 120° C. under agitation thus forming the adduct between $MgCl_2$ and the alcohol that melted and mixed with the dispersing agent. The nitrogen pressure inside the autoclave was maintained at 1.5 Pa. The drawing pipe of the autoclave was heated externally to 120° C. with a heating jacket, which had an inside diameter of 1 mm, and was 3 meters long from one end of the heating jacket to the other. Then the mixture was caused to flow through the pipe at a velocity of 7 m/sec. At the exit of the pipe the dispersed liquid was gathered in a 5 L flask, under agitation, containing 2.5 L of kerosene, and being externally cooled by way of a jacket maintained at an initial temperature of minus 40° C. The final temperature of the dispersed liquid was 0° C. The spherical solid product that constituted the dispersed phase of the emulsion was separated by way of settling and filtration, and then washed with heptane and dried. All these operations were carried out in an inert gas atmosphere. One hundred and thirty (130) g of $MgCl_2 3C_2H_5OH$ in the form of spherical solid particles with a minimum diameter less than or equal to 50 microns were obtained. The alcohol was removed from the products thus obtained at temperatures that gradually increased from 50 to 100° C. in nitrogen current until the alcohol content was reduced to 2.1 moles per mole of $MgCl_2$.

Preparation of the Solid Catalyst

In a 500 mL cylindrical glass reactor equipped with a filtering barrier at 0° C. were introduced 225 ml of $TiCl_4$, and, under agitation in a period of 15 minutes, 10.1 g (54 mmols) of microspheroidal $MgCl_2 2.1C_2H_5OH$ obtained as above. At the end of the addition, the temperature was brought to 70° C., and 9 mmols of 9,9-bis(methoxymethyl) fluorene was introduced. The temperature was increased to 100° C. and, after 2 hours, the $TiCl_4$ was removed by filtration. Two hundred (200) ml of $TiCl_4$ and 9 mmols of 9,9-bis(methoxymethyl)fluorene were added; after 1 hour at 120° C. the content is filtered again and another 200 mL of $TiCl_4$ were added, continuing the treatment at 120° C. for one more hour; finally, the content was filtered and washed at 60° C. with n-heptane until all chlorine ions disappeared from the filtrate. The catalyst component obtained in this manner contained 3.6 weight % of Ti and 16.1 weight % of 9,9-bis(methoxymethyl)fluorene.

Polymerization

In a 6 liter autoclave, previously purged with gaseous propylene at 70° C. for 1 hour, were introduced at ambient temperature and in propylene current 7 mmols of aluminum triethyl, 0.35 mmols of ethyl 2-tert-butyl-3-methoxypropionate and 70 ml of anhydrous n-hexane containing 4 mg of the solid catalyst component prepared as described above. The autoclave was closed, 1.7 NL of hydrogen and 1.2 kg of liquid propylene were introduced; the agitator was put in motion and the temperature was increased to 70° C. in a period of 5 minuets. After 2 hours at 70° C., the agitation was interrupted, the nonpolymerized monomer was removed, and the content was cooled to ambient temperature.

The results of the polymerization are set forth in Table 1.

Example 2

The polymerization was carried out in the same manner as described in Example 1 except that the amount of hydrogen used was changed to the value indicated in Table 1.

The results of the polymerization are set forth in Table 1.

Comparative Example 1

Polymerization

In a 6 liter autoclave, previously purged with gaseous propylene at 70° C. for 1 hour, were introduced at ambient temperature and in propylene current 7 mmols of aluminum triethyl, 0.35 mmols of dicyclopentyldimethoxysilane and 70 ml of anhydrous n-hexane containing 4 mg of the solid catalyst component prepared as described in the Example 1. The autoclave was closed, 1.7 NL of hydrogen and 1.2 kg of liquid propylene were introduced; the agitator was put in motion and the temperature was increased 70° C. in a period of 5 minuets. After 2 hours at 70° C., the agitation was interrupted, the nonpolymerized monomer was removed, and the content is cooled to ambient temperature.

The results of the polymerization are set forth in Table 1.

Comparative Example 2

The polymerization was carried out in the same manner as described in Comparative Example 1 except that the amount of hydrogen used was changed to the value indicated in Table 1.

The results of the polymerization are set forth in Table 1.

Comparative Example 3

Polymerization

In a 6 liter autoclave, previously purged with gaseous propylene at 70° C. for 1 hour, were introduced at ambient temperature and in propylene current 7 mmols of aluminum triethyl, 0.35 mmols of 9,9-bis(methoxymethyl)fluorene and 70 ml of anhydrous n-hexane containing 4 mg of the solid catalyst component obtained in Example 1 above. The autoclave was closed, 1.7 NL of hydrogen and 1.2 kg of liquid propylene were introduced; the agitator was put in motion and the temperature was increased to 70° C. in a period of 5 minuets. After 2 hours at 70° C., the agitation was interrupted, the nonpolymerized monomer was removed, and the content was cooled to ambient temperature. The results of the polymerization are set forth in Table 1.

Examples 3–4

The preparation of catalysts, polymerization and evaluation were carried out in the same manner as described in Example 1 except that the polymerization was conducted under polymerization conditions set forth in Table 1.

The results of the polymerization are set forth in Table 1.

Examples 5–10

The compounds reported in the Table 1 were used instead of ethyl 3-ethoxy-2-tert-butylpropionate used in the Example 1. The results of the polymerization are set forth in Table 1.

TABLE 1

| Ex. | solid catalyst (mg) | external donor(ED) | ED (mmol) | Al/ED (m.r.) | time (h) | temp. (° C.) | $H_2$ (molppm) | yield (g) | Activity (g/gcat) | XI (wt %) | MFR |
|---|---|---|---|---|---|---|---|---|---|---|---|
| 1 | 6.0 | 3-ethoxy-2-tert-butyl-ethylpropionate | 4.1 | 10 | 2 | 70 | 2400 | 508 | 85,000 | 99.1 | 23.2 |
| 2 | 6.0 | 3-ethoxy-2-tert-butyl-ethylpropionate | 4.1 | 10 | 2 | 70 | 7000 | 490 | 81,000 | 98.8 | 179.7 |
| Comp. 1 | 6.6 | Dicyclopentyldimethoxysilane | 4.1 | 10 | 2 | 70 | 2400 | 505 | 76,000 | 99.0 | 16.8 |
| Comp. 2 | 9.4 | Dicyclopentyldimethoxysilane | 4.1 | 10 | 2 | 70 | 7000 | 528 | 56,000 | 98.8 | 117.6 |
| Comp. 3 | 12.2 | 9,9-bis(methoxymethyl)fluorene | 4.1 | 10 | 2 | 70 | 2400 | 551 | 45,000 | 97.5 | 20.0 |
| 3 | 6.2 | 3-ethoxy-2-tert-butyl-ethylpropionate | 8.1 | 20 | 2 | 70 | 2400 | 509 | 82,000 | 99.3 | 21.1 |

TABLE 1-continued

| Ex. | solid catalyst (mg) | external donor(ED) | ED (mmol) | Al/ED (m.r.) | time (h) | temp. (° C.) | H$_2$ (molppm) | yield (g) | Activity (g/gcat) | XI (wt %) | MFR |
|---|---|---|---|---|---|---|---|---|---|---|---|
| 4 | 6.6 | 3-ethoxy-2-tert-butyl-ethylpropionate | 4.1 | 10 | 2 | 80 | 2400 | 576 | 87,000 | 98.9 | 27.2 |
| 5 | 7.2 | 3-ethoxy-ethylpropionate | 4.1 | 10 | 2 | 70 | 2400 | 560 | 78,000 | 98.5 | 39.1 |
| 6 | 8.0 | 3-ethoxy-2-iso-propyl-ethylpropionate | 4.1 | 10 | 2 | 70 | 2400 | 582 | 73,000 | 98.7 | 32.6 |
| 7 | 6.1 | 3-ethoxy-2-phenyl-ethylpropionate | 4.1 | 10 | 2 | 70 | 2400 | 516 | 85,000 | 98.8 | 29.9 |
| 8 | 6.5 | 3-methoxy-2-tert-butyl-ethylpropionate | 4.1 | 10 | 2 | 70 | 2400 | 529 | 82,000 | 98.8 | 30.9 |
| 9 | 6.4 | 4-ethoxy-ethylbutyrate | 4.1 | 10 | 2 | 70 | 2400 | 504 | 79,000 | 98.5 | 42.5 |
| 10 | 6.6 | 4-ethoxy-ethyl-cyclohexanecarboxynate | 4.1 | 10 | 2 | 70 | 2400 | 531 | 81,000 | 98.7 | 34.4 |

What is claimed is:

1. An olefin polymerization catalyst comprising:
   (A) a solid catalyst component comprising magnesium, titanium, halogen and an electron-donating compound selected from ether compounds having at least two ether groups and that, under a complexing test of the ethers with, MgCl$_2$, are capable of forming complexes with anhydrous magnesium chloride for less that 60 mmoles per 100 g of chloride and that they do not undergo substitution reactions with TiCl$_4$, or they only do so for less than 50% in moles;
   (B) an organic aluminum compound; and
   (C) an alkoxyester compound represented by the general formula (I):

$$(R^1O)_i(R^2O)_j(R^3O)_k-Z-COOR^4 \quad (I)$$

in which each of $R^1$, $R^2$, $R^3$ and $R^4$ is, independently, selected from the group consisting of (i) an aliphatic hydrocarbon group, (ii) an alicyclic hydrocarbon group, (iii) an aromatic hydrocarbon group, (iv) a polycyclic hydrocarbon group, and (v) a heterocyclic compound group; Z is an aliphatic or alicyclic hydrocarbon group which may be substituted with an aromatic group or a polycyclic group; and i, j and k each are integers from 0 to 3, with the proviso that the sum of i, j and k is at least 1.

2. The catalyst according to claim 1 in which the solid catalyst component A comprises a titanium compound containing at least one Ti-halogen bond supported on a magnesium halide.

3. The catalyst according to claim 2 in which the Ti compound having at least one Ti-halogen bond is TiCl$_4$, TiCl$_3$ or Ti-haloalcoholates of formula Ti(OR)$_{n-y}$X$_y$ where n is the valence of titanium, y is a number between 1 and n-1, X is halogen and R is a hydrocarbon radical having from 1 to 10 carbon atoms.

4. The catalyst according to claim 1 in which, in the solid catalyst component (A), the ether compounds having at least two ether groups belong to the class of the 1,3-diethers of formula (II)

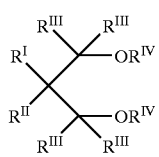

where $R^I$ and $R^{II}$ are the same or different and are selected from the group consisting of (i) hydrogen and (ii) linear or branched C$_1$–C$_{18}$ hydrocarbon groups which can also form one or more cyclic structures; $R^{III}$ groups, equal or different from each other, are hydrogen or C$_1$–C$_{18}$ hydrocarbon groups; $R^{IV}$ groups equal or different from each other, have the same meaning as $R^{III}$ except that they cannot be hydrogen; each of $R^I$ to $R^{IV}$ groups can contain heteroatoms selected from halogens, N, O, S and Si.

5. The catalyst according to claim 1 in which in the solid catalyst component A, the ether compounds having at least two ether groups, belongs to the class of cyclopolyenic 1,3-diethers in which the carbon atom in position 2 belongs to a cyclic or polycycic structure made up of 5, 6, or 7 carbon atoms, or of 5-n or 6-n' carbon atoms, and respectively n nitrogen atoms and n' heteroatoms selected from the group consisting of N, O, S and Si, where n is 1 or 2 and n' is 1, 2 or 3, said structure containing two or three unsaturations (cyclopolyenic structure), and optionally being condensed with other cyclic structures, or substituted with one or more substituents selected from the group consisting of linear or branched alkyl radicals: cycloalkyl, aryl, aralkyl, alkaryl radicals and halogens, or being condensed with other cyclic structures and substituted with one or more of the above mentioned substitutes selected that can also be bonded to the condensed cyclic structures; one or more of the above mentioned alkyl, cycloalkyl, aryl, aralkyl, or alkaryl radicals and the condensed cyclic structures optionally containing one or more heteroatoms as substitutes for carbon or hydrogen atoms, or both.

6. The catalyst according to claim 5 in which the cyclopolyenic 1,3-diether has the formula (III):

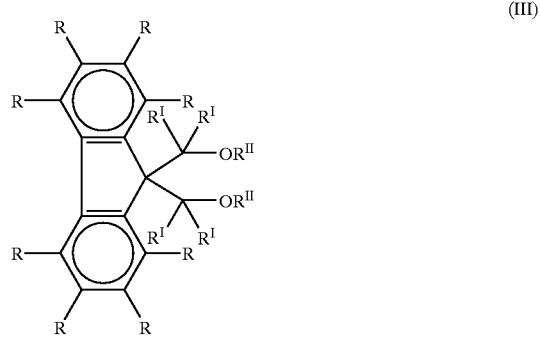

where the R groups, equal or different, are selected from the group consisting of hydrogen; halogens; C$_1$–C$_{20}$ alkyl groups, linear or branched; C$_3$–C$_{20}$ cycloalkyl; C$_6$–C$_{20}$ aryl; C$_7$–C$_{20}$ alkylaryl and C$_7$–C$_{20}$ aralkyl groups, optionally containing one or more heteroatoms selected from the group consisting of N, O, S, P, Si and halogens as substitutes for carbon or hydrogen atoms, or both; the groups $R^I$, same or different from each other, are selected from the group consisting of hydrogen; halogens; $C_1$–$C_{20}$ alkyl groups, linear or branched; $C_3$–$C_{20}$ cycloalkyl; $C_6$–$C_{20}$ aryl; $C_7$–$C_{20}$ alkaryl and $C_7$–$C_{20}$aralkyl groups; the $R^{II}$ groups, same or different from each other, are selected from the group consisting of $C_1$–$C_{20}$ alkyl groups, linear or branched; $C_3$–$C_{20}$ cycloalkyl; $C_6$–$C_{20}$ aryl; $C_7$–$C_{20}$ alkaryl and $C_7$–$C_{20}$ aralkyl groups.

7. The catalyst according to claim 6 in which the diether is 9, 9-bis (methoxymethyl)-fluorene.

8. The catalyst according to claim 1 in which the aluminum alkyl cocatalyst (B) has the formula (IV):

in which $R^5$, $R^6$ and $R^7$ may be the same or different and each represents a hydrocarbon group having 12 or less carbon atoms, a halogen atom or a hydrogen atom, provided that at least one of $R^5$, $R^6$ and $R^7$ is a hydrocarbon group.

9. The catalyst according to claim 8 in which the aluminum alkyl is a trialkyl aluminum.

10. The catalyst according to claim 1 in which the alkoxyester (C) has the formula (V)

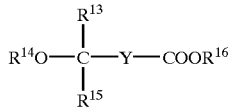

in which each of $R^{14}$ and $R^{16}$ independently represents an aliphatic hydrocarbon group having 1 to 20 carbon atoms; each of $R^{13}$ and $R^{15}$ independently represents a hydrogen atom or an aliphatic hydrocarbon group having 1 to 20 carbon atoms and Y represents a divalent linear hydrocarbon group having 1 to 4 carbon atoms, which is substituted with a group selected from the group consisting of (a) an aliphatic hydrocarbon group, (b) an aromatic hydrocarbon group, (c) a polycyclic hydrocarbon group, and (d) an alicycic hydrocarbon group having 6 to 12 carbon atoms.

11. The catalyst according to claim 10 in which the alkoxyester has a bulky substituting group with at least 3 carbon atoms at the second or third position counted from the carboxyl group, and Y represents a linear hydrocarbon group.

12. The catalyst according to claim 10 in which the alkoxyester has a 4- to 8-membered cycloalkane at the second or third position counted from the carboxyl group.

13. The catalyst according to claim 1 in which the alkoxyester is selected from the group consisting of 3-ethoxy-2-tert-butyl-ethylpropionate, 3-ethoxy ethylpropionate, 3-ethoxy-2-iso-propyl-ethylpropionate, 3-ethoxy-2-phenyl-ethylpropionate, 3-methoxy-2-tert-butyl-ethylpropionate, 4-ethoxy-ethylbutyrate, and 5 4-ethoxy-ethyl-cyclohexane carboxylate.

14. The catalyst according to claim 10 in which the alkoxyester is selected from the group consisting of 3-ethoxy-2-tert-butyl-ethylpropionate, 3-ethoxy-ethylpropionate, 3-ethoxy-2-iso-propyl-ethylpropionate, 3-ethoxy-2-phenyl-ethylpropionate, 3-methoxy-2-tert-butyl-ethylpropionate, 4-ethoxy-ethylbutyrate, and 4-ethoxy ethyl-cyclohexane carboxylate.

15. A process for the polymerization of olefins of formula $CH_2$=CHR, in which R is hydrogen or a hydrocarbyl radical with 1–12 carbon atoms, the process comprising polymerizing in the presence of a catalyst comprising:

(A) a solid catalyst component comprising magnesium, titanium, halogen and an electron-donating compound selected from ether compounds having at least two ether groups and that, under a complexing test of the ethers with $MgCl_2$, are capable of forming complexes with anhydrous magnesium chloride for less than 60 mmoles per 100 g of chloride and that do not undergo substitution reactions with $TiCl_4$, or they only do so for less than 50% in moles;

(B) an organic aluminum compound; and (C) an alkoxyester compound represented by the general formula (I):

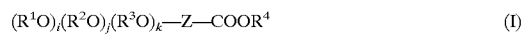

in which each of $R^1$, $R^2$, $R^3$ and $R^4$ independently represents a group selected from the group consisting of (i) an aliphatic hydrocarbon group, (ii) an alicyclic hydrocarbon group, (iii) an aromatic hydrocarbon group, (iv) a polycyclic hydrocarbon group and (v) a heterocyclic compound group; Z represents an aliphatic or alicyclic hydrocarbon group which may be substituted with an aromatic group or a polycyclic group; and i, j and k each are integers from 0 to 3, with the proviso that the sum of i, j and k is at least 1.

* * * * *